United States Patent [19]
Roberts

[11] Patent Number: 5,183,073
[45] Date of Patent: Feb. 2, 1993

[54] HANDLE LOCKING MECHANISM FOR QUARTER TURN VALVES

[75] Inventor: John L. Roberts, West Milwaukee, Wis.

[73] Assignee: Milwaukee Valve Company, Inc, Milwaukee, Wis.

[21] Appl. No.: 862,330

[22] Filed: Apr. 2, 1992

[51] Int. Cl.⁵ .............................................. F16K 35/06
[52] U.S. Cl. ...................................... 137/385; 70/117; 70/180; 70/212; 251/95; 251/104; 251/105; 251/110; 251/288
[58] Field of Search ................. 70/175, 176, 177, 180, 70/183, 187, 202, 203, 210, 211, 212; 137/385; 251/95, 98, 99, 104, 105, 110, 288; 292/106, 207; 74/526, 543, 545; 16/110 R

[56] References Cited

U.S. PATENT DOCUMENTS

| | | | |
|---|---|---|---|
| 934,099 | 9/1909 | Sheafe | 251/104 |
| 1,758,727 | 5/1930 | Wildin | 251/104 |
| 2,912,218 | 11/1959 | Stillwagon | 251/110 |
| 3,228,415 | 1/1966 | Geiss | 251/101 |
| 3,355,141 | 11/1967 | Cooper | 251/101 |
| 3,648,970 | 3/1972 | Hartmann et al. | 137/385 |
| 4,126,023 | 11/1978 | Smith et al. | 137/385 |
| 4,203,572 | 5/1980 | Coffman | 251/104 |
| 4,747,427 | 5/1988 | Smith et al. | 251/101 |
| 4,770,388 | 9/1988 | Carman | 251/95 |
| 5,014,528 | 5/1991 | Roberts | 70/177 |

Primary Examiner—George L. Walton
Attorney, Agent, or Firm—Michael, Best & Fredrich

[57] ABSTRACT

A rotatable control device including a body housing a control structure and having an external boss; a control shaft journalled in the boss for rotation about an axis and having an internal portion connected to the control structure and an external portion extending outwardly from the boss; an operating handle having an inner end portion connected to the external portion of the control shaft, a gripping end portion for rotating the control structure between first and second positions and an intermediate portion; first and second locking structure circumferentially spaced on the body at locations corresponding to the positions of the intermediate portion of the handle when the control structure is in the first and second positions, respectively; a slider member slidably mounted on the intermediate portion of the handle for reciprocative movement between locked and unlocked positions; interlocking structure for cooperating with the first and second locking structure, when the handle is in the first and second position, respectively, and the slider member is in the locking position, to restrain rotational movement of the handle; and bias structure for biasing the slider member toward the locked position irrespective of the orientation of the handle.

16 Claims, 2 Drawing Sheets

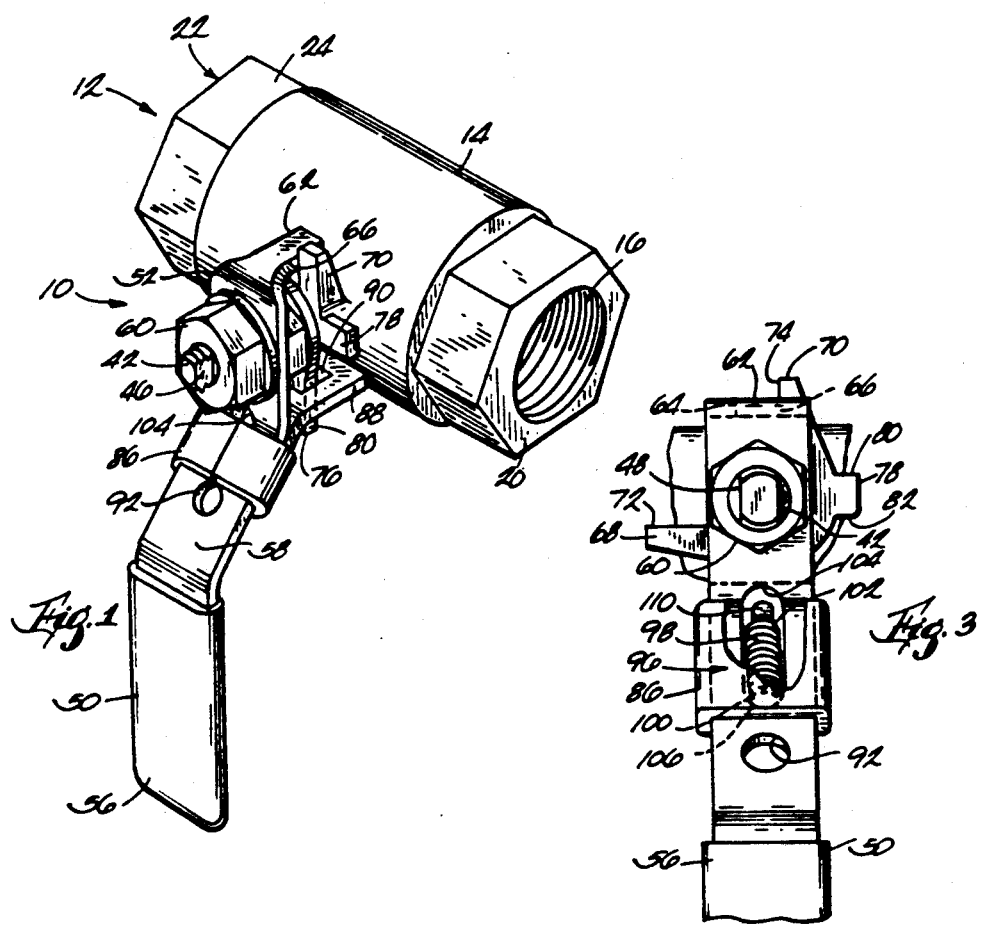
Fig. 1
Fig. 3
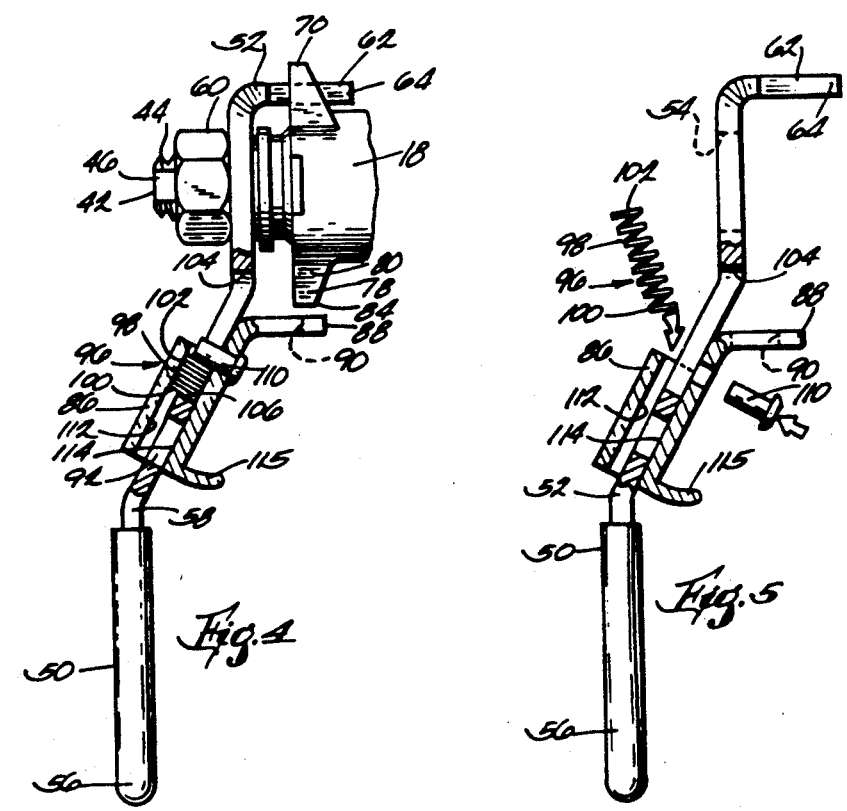
Fig. 4
Fig. 5

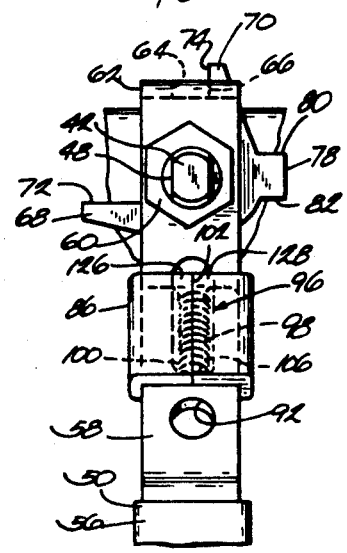
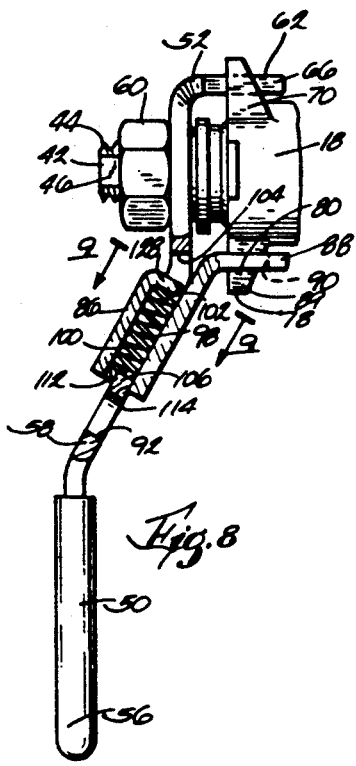
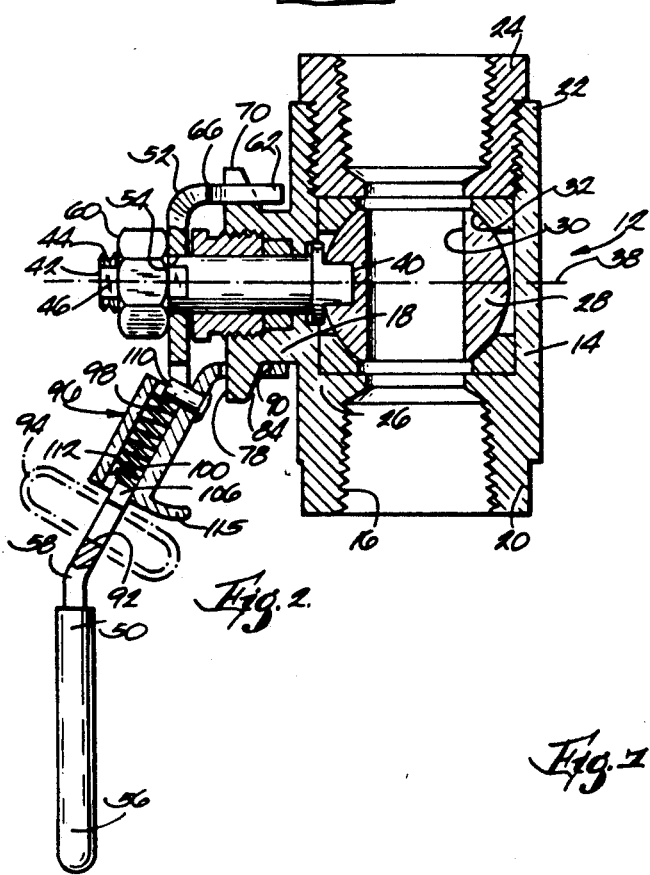
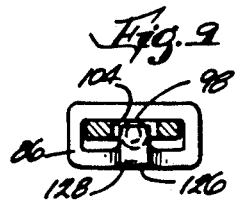
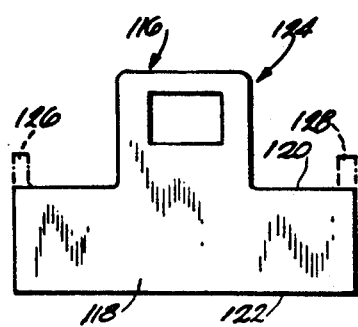

HANDLE LOCKING MECHANISM FOR QUARTER TURN VALVES

BACKGROUND OF THE INVENTION

This invention relates to tamper-proof locking mechanisms for controls having a rotatable control shaft projecting outwardly from a body housing a control means. In one aspect, the invention relates to mechanisms for locking quarter turn valves, such as ball valves, butterfly valves and plug valves, in a fully open and/or a fully closed position.

In some fluid operations, it is essential that certain manually-operated control valves be maintained in either the full open or closed position during normal operation. For example, Occupational Safety and Health Administration regulations require that certain control valves in hydraulic and pneumatic systems to be positively locked in the open or closed position. Another example is fire protection sprinkler systems where the control valves must be fully open at all times to insure proper water flow in the event of an emergency.

When such valves are located in areas where there is a risk of intentional tampering or where they may be unintentionally closed, opened or otherwise mispositioned, a locking mechanism which reliably and positively locks the operating handle in a selected position is required. To be completely effective, the locking mechanism must not only prevent rotational movement of the operating handle, but also prevent the operating handle from being lifted off the stem, even though a nut or the like holding the handle on the valve stem has been removed.

U.S. Pat. No. 5,014,528 discloses a locking and latching mechanism for quarter turn valves including an operating handle which is rotated to move a valve member between open and closed positions. The locking mechanism includes a pair of circumferentially-spaced lugs on the boss at locations corresponding to open and closed valve positions. A slider, mounted on the intermediate portion of the handle for reciprocative movement between locked and unlocked positions, carries a latch element having an open portion for receiving the respective one of the lugs when the handle is either open or closed. The open portion of the latch element engages the side surfaces of the lugs to restrain rotational movement of the handle when the slider is in the locked position. The open portion also has a bottom wall for engaging the bottom surface of the lugs to restrain axial movement of the handle relative to the control shaft when the slider is in the locked position.

The slider can be held in the locked position by a locking member, such as a padlock, mounted in an aperture in the intermediate portion of the handle, adjacent the slider when it is in the locked position. When such a locking member is not installed, the slider is biased by gravity toward a locked position when the valve is oriented either so that the handle is slightly upwardly in the open or closed position or generally vertically upwardly in the open position. However, when the valve of necessity must be installed in another orientation, e.g., because of restrictions of space or system layout, so that the handle is pointing downwardly when in one position or the other, gravity tends to cause the slider to slide away from the locking position. When that occurs, the handle is free to be moved, through inadvertent contact or otherwise, to partially or fully open or close the valve.

SUMMARY OF THE INVENTION

One of the principal objects of the invention is to provide a simply constructed locking mechanism for rotatable control devices, such as quarter turn valves, for positively locking an operating handle connected to a rotatable control means, such as a valve member, in a selected position against unauthorized tampering.

Another object of this invention is to provide such a locking mechanism including means for maintaining it a locked position regardless of the orientation of the valve.

A further object is to provide such a valve which can be easily constructed.

This invention provides a locking mechanism for rotatable control devices including a body housing a control means, a control shaft journalled in an external boss on the housing for rotation about an axis and connected to the control means, an operating handle having an inner end portion connected to an external portion of the control shaft, a gripping end portion for rotating the control means between first and second positions and an intermediate portion, and first and second locking means on the body at locations corresponding to the positions of the intermediate portions of the handle when the control means is in the first and second positions.

The locking mechanism includes a slider member slidably mounted on the intermediate portion of the handle for reciprocative movement between locking and unlocked positions, interlocking means for cooperating with the first and second locking means, when the handle is in the first and second position, respectively, and the slider member is in the locking position, to restrain rotational movement of the handle and bias means for biasing the slider member toward the locked position irrespective of the orientation of the handle. The bias means preferably is a compression spring with one end bearing against the slider member in a manner to bias the slider member forward the locked position.

In one embodiment, the intermediate portion of the handle includes an elongated slot extending generally parallel to the travel path of the slider member between the locked and unlocked positions and a compression spring is disposed in the slot with one end bearing against one end of the slot and the other end bearing against a stop means on the slider member.

The locking mechanism provided by the invention is particularly adaptable for use on quarter turn valves for fluid systems, such as ball valves, butterfly valves and plug valves.

BRIEF DESCRIPTION OF THE DRAWINGS

FIG. 1 is a perspective view of a ball valve embodying the invention.

FIG. 2 is full side sectional view of the valve of FIG. 1, showing a padlock in phantom with the valve in the open position and the slider member in the locked position.

FIG. 3 is a fragmentary elevational view of the valve stem and handle with a portion of the slider member cut away to expose the spring with the slider member in the locked position.

FIG. 4 is a fragmentary, partially sectioned side view of the valve with the slider member in the unlocked position.

FIG. 5 is a fragmentary, partially sectioned side view of the handle and slider member prior to installation of the spring and stop means.

FIG. 6 is a fragmentary elevational view similar to FIG. 3 illustrating an alternative arrangement of the slider member.

FIG. 7 is a plan view of a blank from which the slider member is formed.

FIG. 8 is a fragmentary, partially sectioned side view of the alternative embodiment illustrated in FIG. 6.

FIG. 9 is sectional view taken generally along line 8—8 in FIG. 8.

DESCRIPTION OF THE PREFERRED EMBODIMENT

The locking mechanism of the invention can be adapted for a wide variety of controls including a rotatable control shaft carrying a control means and a manually operated handle connected to the control shaft for rotational movement of the control means, such as rheostats, potentiometers, variable capacitors, control cable operators and the like. It is particularly adaptable for manually-operated, quarter turn valves, such as ball valves, butterfly valves and plug valves, and will be described in connection with a ball valve similar to that disclosed in U.S. Pat. No. 5,014,528, which is incorporated herein by reference.

The valve 12 includes a body 14 defining an internal flow passage 16 extending therethrough and an external boss 18 (FIG. 2). One end 20 of the body 14 is internally threaded for connection in a piping system (not illustrated) and the opposite end 22 is internally threaded and receives an adapter section 24 which is internally threaded for connection in a piping system (not shown). Disposed inside the body 14 is a rotatable valve member 26 consisting of a ball 28 having a central opening 30. The ball 28 is mounted on valve seats 32 for rotational movement between an open position wherein the opening 30 is aligned with the flow passage 16 as illustrated in FIG. 2 and a closed position wherein the opening 30 is rotated 90° to the position illustrated in FIG. 2 and the ball 28 blocks flow through the passage 16.

A stem 34 is journalled in the boss 18 via a bearing sleeve 36 threaded into the boss 18. The stem 34 forms an axis 38 and has an internal end portion 40 connected to the ball 28 and an external end portion 42 which projects outwardly from the boss 18. The external outer end portion 42 has a terminal part 44 which is threaded and which has opposed flat surfaces 46 and 48 (FIG. 3). The ball 28 is rotated back and forth about the stem axis 38, between the fully open and closed positions, by a manually-operated handle 50 including an inner end portion 52 having a slot 54 for receiving the external end portion 42 of the stem 34, a gripping portion 56 and an intermediate portion 58. The handle 50 is held on the stem 34 by a nut 60 threaded onto the external end portion 52.

The valve 12 includes stop means for limiting rotation of the ball 28 to a quarter turn of 90° between the fully open and closed position. In the specific embodiment illustrated, the stop means (FIGS. 1 and 4) comprises an in-turned finger 62 on the inner end portion 52 of the handle 50 having opposed edges 64 and 66, and a pair of projections 68 and 70 on the boss 18 which are circumferentially spaced relative to the stem axis 38. The projection 68 and 70 have generally flat surfaces 72 and 74 (FIG. 3), respectively. The surfaces 72 and 74 are located in the rotational path of the finger 62 and are engaged by the finger edges 64 and 66 when the ball 28 has been rotated to the fully open position and the fully closed position, respectively.

The locking mechanism 75 is arranged to prevent the handle 50 from being moved from the fully open or from the fully closed position and also to prevent the handle 50 from being lifted off the external end portion 42 of the stem 28, even when the nut 60 has been removed.

The locking mechanism 75 includes a pair of lugs (FIGS. 1 and 2), or first and second lugs 76 and 78 on the boss 18, circumferentially spaced, relative to the stem axis 38, and disposed at locations corresponding to the positions of the intermediate portion 58 of the handle 50 when the valve member 26 is in the open and closed positions, respectively. The lugs 76 and 78 each have generally flat side surfaces 80 and 82 and a bottom surface 84, and the lugs 76 and 78 extend radially outwardly relative to the stem axis 38.

The locking mechanism 75 also includes a slider member 86 encircling or enveloping and slidably mounted on the intermediate portion 58 of the handle 50 for reciprocative movement between a locked position, illustrated in FIG. 2, and an unlocked position, illustrated in FIG. 4. Connected to the slider member 86 is a latch element 88 which extends inwardly toward the valve body 14 and parallel to the valve axis 38. The latch element 88, preferably is formed as an integral part of the slider member 86 and includes an opening 90 which receives the first and second lugs 76 and 78 when the handle 50 is in the open and closed positions, respectively, and when the slider member 86 is in the locking position, to restrain rotational movement of the handle 50 from such position.

When the slider member 86 is slid up the handle 50 to a retracted position, the opening 90 of the latch element 88 is spaced away from lugs 76 and 78 and the handle 50 can be freely rotated between the open and closed positions. In the specific embodiment illustrated, the handle intermediate portion 58 is inclined outwardly relative to the body 14 in a direction away from the boss 18 (i.e., extends at an acute angle to the stem axis 38).

The locking mechanism 75 preferably includes means for positively locking the slider member 86 in the locked position until it is desired to change the valve position. While various suitable arrangements can be used for this purpose, in the specific embodiment illustrated, the handle intermediate portion 58 includes an aperture 92 located adjacent the outer edge of the slider member 86 when it is in the locked position. The aperture 92 is sized to receive a pin or the like which is locked in place. For example, it can be sized to receive the shackle of a padlock 94 as illustrated in FIG. 2.

In accordance with the invention, bias means 96 are provided for biasing the slider member 86 toward the locked position irrespective of the orientation of the handle 50. The bias means 96 can be a compression spring 98 connected to the slider member 86 and operative to bias the slider member 86 in a direction toward the rotational axis 38 of the stem 34. One end 100 of the compression spring 98 bears against the slider member 86 and the other end 102 bears against the handle intermediate portion 58.

In the preferred embodiment illustrated, the handle 50 has an elongated slot 104 which extends generally parallel to the travel path of the slider member 86. The slot 104 has an outer end portion 106 and the compression spring 98 is disposed within the slot 104 so that one end 102 bears against the slot outer end portion 106. The slider member 86 also has a stop means such as a pin or rivet 110, and the other end of the compression spring 100 bears against the rivet 110.

In the embodiment illustrated in FIGS. 1 through 5, the rivet 110 is mounted on the slider member 86 and extends into the elongated slot 104. Other suitable mounts can be used as the stop means, such as a threaded member, e.g., screw or the like (not illustrated). As illustrated in FIG. 5, the slider member 86 is first installed on the handle 50 and retracted to uncover the slot 104. The spring 98 is inserted into the slot 104 and one end 102 is pushed against the outer end 106 of the slot 104 and the rivet 110 is installed at a location on the slider member 86 where the spring 98 is restrained within the slot 104 between the rivet 110 and the outer end 106 of the slot 104.

In the preferred embodiment illustrated, the slider member 86 completely encircles the intermediate portion 58 of the handle 50 and has opposed top and bottom walls 112 and 114 (FIGS. 4, 5 and 8) which cover at least a substantial portion of the elongated slot 104 when the slider member 86 is in the locked position. Thus, the top and bottom walls 112 and 114 of the slider member 86 effectively sandwich the spring 98 in the slot 104. When the slider member 86 is retracted, the spring 98 is compressed and, when the slider member 86 is released, the spring 98 expands and returns the slider member 86 to the locked position where one of the lugs 76 or 78 is received in the latch opening 90.

To facilitate movement of the slider member 86 t the unlocked position, a downwardly extending tang 115 can be provided on the end of the slider member 86 closest to the gripping portion 56 of the handle 50 as illustrated in FIGS. 2, 4 and 5. The tang 115, which is shaped to serve like a trigger for receiving the operator's fore finger, preferably is formed as an integral part of the slider member 86. Thus, while grasping the gripping portion 56 of the handle 50, an operator can pull on the tang 115 to move the slider member 86 against the biasing force of the spring 98 to the unlocked position, rotate the ball 28 to the open or closed position and release the tang 115 so that the spring 98 can move the slider member 86 back to the locked position.

As illustrated in FIG. 7, the slider member 86 preferably is formed as a one-piece unit from a generally T-shaped metal blank or stamping 116 including an elongated band or cross member 118 which has opposed side edges 120 and 122 and which is formed around the intermediate portion 58 of the handle 50. The stamping 116 also includes a shorter central leg 124 which extends from one side edge 120 of the cross member 118 and which is formed into the latch element 88. When the slider member 86 has a tang 115 as illustrated in FIGS. 2, 4 and 5, the stamping 116 includes a short central leg (not shown) which extends from the side edge 122 and is bent down to form the tang 115.

In the alternate embodiment illustrated in FIGS. 8 and 9 and by dashed lines in FIG. 7, the stamping 116 includes one or more projections 126 and 128 (e.g., two) extending from one side edge 120 of the cross member 118 at locations corresponding to the slot 104 when the cross member 118 is formed around the intermediate portion 58 of the handle 50. During the forming process, the 126 and 128 are bent into the slot 104 and form tangs which serve as stop means for the spring 98.

While less desirable, the band or cross member 118 can be a separate part with the latch element portion 88 connected to one side edge 120 after the cross member 118 has been formed around the intermediate portion 58 of the handle 50.

From the foregoing description, one skilled in the art can easily ascertain the essential characteristics of the invention and, without departing from the spirit and scope thereof, make various changes and modifications to adapt it to various usages.

I claim:

1. A rotatable control device including
a body housing a control means and having an external boss;
a control shaft journalled in said boss for rotation about an axis and having an internal portion connected to said control means and an external portion extending outwardly from said boss;
an operating handle having an inner end portion connected to the external portion of said control shaft, a gripping end portion for rotating said control means between first and second positions and an intermediate portion including an elongated slot;
first and second locking means circumferentially spaced on said body at locations corresponding to the positions of the intermediate portion of said handle when said control means is in the first and second positions, respectively;
a slider member slidably mounted on the intermediate portion of said handle for reciprocative movement between locked and unlocked positions, said slider member having opposed walls which overlay said slot;
interlocking means for cooperating with said first and second locking means, when said handle is in the first and second position, respectively, and said slider member is in the locking position, to restrain rotational movement of said handle; and
a spring disposed in said slot for biasing said slider member toward the locked position irrespective of the orientation of said handle, said spring being covered by and retained in said slot by the opposed walls of said slider member, having a first end bearing against the slider member and having a second end bearing against the intermediate portion of said handle.

2. A control device according to claim 1 wherein
said slot has an outer end portion and the second end of said spring bears against the outer end portion of said slot; and
said slider member includes stop means and the first end of said spring bears against said stop means.

3. A control device according to claim 2 wherein
the end portion of said slider member closest to the gripping portion of said handle includes a tang located so that an operator, while grasping the gripping portion of said handle, can pull on said tang to move said slider member against the biasing force of said spring to the unlocked position.

4. A control device according to claim 2 wherein
said stop means extends from one of the walls of said slider member into said slot.

5. A control device according to claim 4 wherein said stop means is a threaded member or a pin.

6. A control device according to claim 4 wherein
said slider member is formed from a blank including an elongated band which has opposed side edges and is formed around the intermediate portion of the handle.

7. A control device according to claim 6 wherein said band includes at least one projection extending from one of the side edges thereof at a location corresponding to said slot; and during the forming process, said projection is bent into said slot and serves as said stop means.

8. A control device according to claim 2 including trigger means carried by said slider member and arranged so that an operator, while grasping the gripping portion of said handle, can pull on said trigger means to move said slider mechanism against the biasing force of said spring to the unlocked position.

9. A valve comprising
a body having a flow passage extending therethrough and an external body;
a valve member disposed in said flow passage;
a stem journalled in said boss for rotation about an axis and having an inner end portion connected to said valve member and an outer end portion extending outwardly from said boss;
an operating handle for rotating said valve member between fully open and fully closed positions and having an inner end portion connected to the outer end portion of said stem, a grip end portion and an intermediate portion including an elongated slot having an outer end portion;
first and second locking means circumferentially spaced on said body at locations corresponding to the positions of the intermediate portion of said handle when said valve member is in the open and closed positions, respectively;
a slider member slidably mounted on the intermediate portion of said handle for reciprocative movement between locked and unlocked positions, said slider member having opposed walls which overlay said slot;
interlocking means for cooperating with said first and second locking means, when said handle is in the open and closed position, respectively, and said slider member is in the locking position, to restrain rotational movement of said handle; and a spring disposed in said slot for biasing said slider member toward the locked position irrespective of the orientation of said handle, said spring being covered by and retained in said slot by the opposed walls of said slider member, having a first end bearing against said slider member and having a second end bearing against the outer end portion of said slot.

10. A valve according to claim 9 wherein
said slider member includes stop means and the first end of said spring bears against said stop means.

11. A valve according to claim 10 wherein
the end portion of said slider member closest to the gripping portion of said handle includes a tang located so that an operation, while grasping the gripping portion of said handle, can pull on said tang to move said slider member against the biasing force of said spring to the unlocked position.

12. A valve according to claim 11 wherein
said stop means extends from one of the walls of said slider member, into said slot.

13. A valve according to claim 12 wherein said stop means is a threaded member or a pin.

14. A valve according to claim 12 wherein
said slider member is formed from a blank including an elongated band which has opposed side edges and is formed around the intermediate portion of the handle.

15. A valve according to claim 14 wherein
said band includes at least one projection extending from one of the side edges thereof at a location corresponding to said slot; and during the forming process, said projection is bent into said slot and serves as said stop means.

16. A valve according to claim 10 including trigger means carried by said slider member and arranged so that an operator, while grasping the gripping portion of said handle, can pull on said trigger means to move said slider mechanism against the biasing force of said spring to the unlocked position.

* * * * *